No. 673,788. Patented May 7, 1901.
C. S. SHARP.
SPRING TOOTH HARROW.
(Application filed Mar. 23, 1899.)
(No Model.) 2 Sheets—Sheet 1.
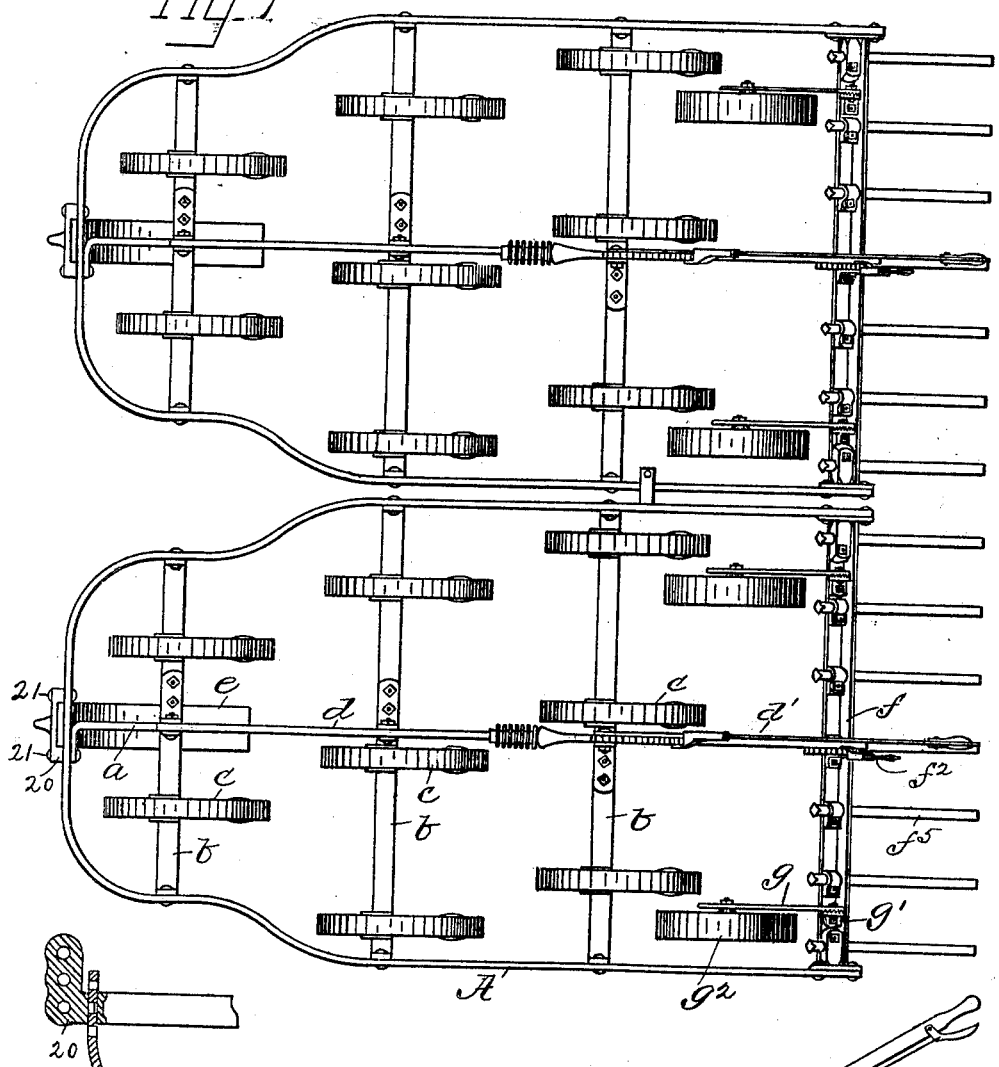
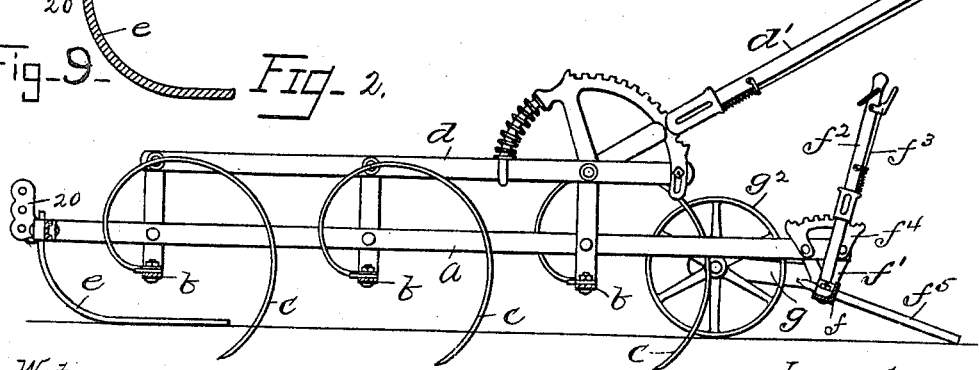
Witnesses:
H. B. Davis.
J. L. Hutchinson
Inventor:
Charles S. Sharp
by B. J. Hayes,
Attorney No. 673,788. Patented May 7, 1901.
C. S. SHARP.
SPRING TOOTH HARROW.
(Application filed Mar. 23, 1899.)
(No Model.)
2 Sheets—Sheet 2.
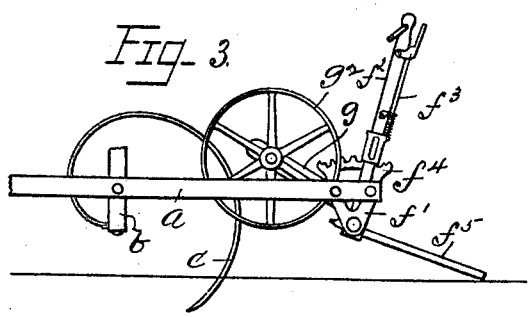
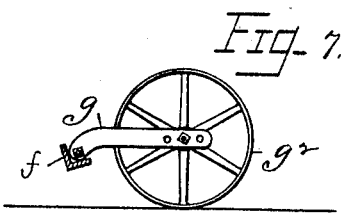
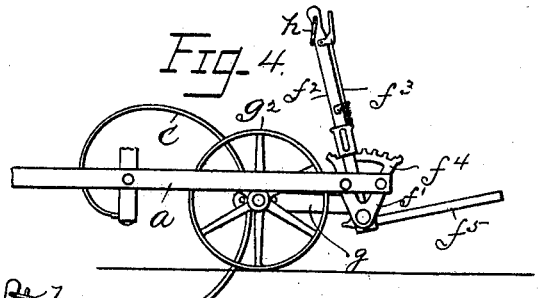
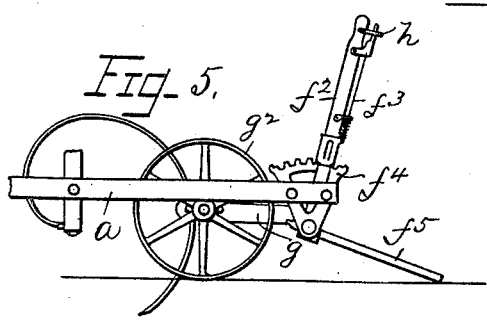
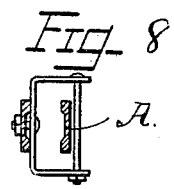
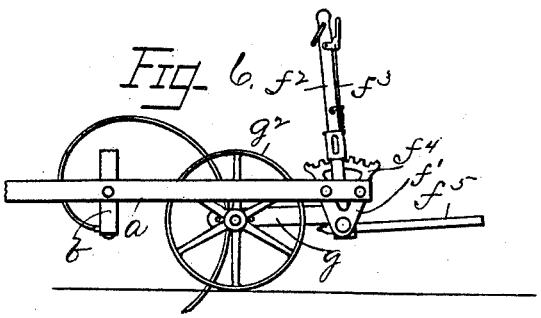
Witnesses:
H. B. Davis
J. L. Hutchinson.
Inventor:
Charles S. Sharp
by B. J. Noyes,
Attorney.

UNITED STATES PATENT OFFICE.

CHARLES S. SHARP, OF AUBURN, NEW YORK, ASSIGNOR TO D. M. OSBORNE & CO., OF SAME PLACE.

SPRING-TOOTH HARROW.

SPECIFICATION forming part of Letters Patent No. 673,788, dated May 7, 1901.

Application filed March 23, 1899. Serial No. 710,148. (No model.)

*To all whom it may concern:*

Be it known that I, CHARLES S. SHARP, of Auburn, county of Cayuga, and State of New York, have invented an Improvement in Spring-Tooth Harrows, of which the following description, in connection with the accompanying drawings, is a specification, like characters on the drawings representing like parts.

This invention relates to harrows, and has for its object to improve the construction of the harrow shown in United States Patent granted to me, No. 589,037, dated August 3, 1897.

In accordance with this invention the rearwardly-declining spike-teeth, which serve as trailing teeth in rear of the set of harrow-teeth, are secured to a pivoted cross-bar, which is provided with means for rocking it and for holding it in a number of different positions, whereby said trailing teeth may be moved and held in several different positions both in and out of contact with the ground, and forwardly-projecting arms are secured to said cross-bar, to the forward extremities of which bearing-wheels are journaled, which as said cross-bar is rocked are moved bodily into and out of contact with the ground. The arms carrying the bearing-wheels are adjustably secured to the cross-bar and may be set in different positions relatively to the trailing teeth, so that when the trailing teeth are raised to discharge trash or for any other purpose the bearing-wheels will be thrown into contact with the ground to thereby support the rear end of the harrow in elevated position at such time and to also regulate the depth that the harrow-teeth shall penetrate the soil, a function which the trailing teeth inherently possess to a certain extent when in contact with the ground and the bearing-wheels are elevated, provided, however, that the soil is quite hard. When the trailing teeth are thus raised and the bearing-wheels brought in contact with the ground, the harrow-teeth may also be raised, if desired, in order that the harrow may be transported upon the front shoes and rear bearing-wheels, or the arms carrying said bearing-wheels may be adjusted relatively to the trailing teeth, so that both the bearing-wheels and trailing teeth will be in contact with the ground, the bearing-wheels at such time supporting the rear end of the harrow and regulating the depth of penetration of both the harrow-teeth and the trailing teeth, and when the bearing-wheels and trailing teeth are so relatively adjusted the means provided for holding them in fixed position may be released, if desired, and in such case the cross-bar bearing both the bearing-wheels and trailing teeth will be free to rock in its bearings, enabling the bearing-wheels and trailing teeth to follow the irregularities of the ground. The soil under certain conditions can be better operated upon by such adjustment of the parts.

Figure 1 shows in plan view a spring-tooth harrow embodying this invention comprising two sections; Fig. 2, a side view of one section thereof, a portion of the frame being broken away, showing the trailing teeth and bearing-wheels both in contact with the ground and also showing the set-lever by means of which said trailing teeth and bearing-wheels are operated and locked in position; Fig. 3, a detail showing the trailing teeth in contact with the ground and the bearing-wheels elevated, the arms carrying said bearing-wheels being adjusted relatively to the trailing teeth; Fig. 4, a detail showing the trailing teeth and bearing-wheels adjusted relatively to each other as in Fig. 3, set, however, with the trailing teeth in elevated position and the bearing-wheels in contact with the ground; Fig. 5, a detail showing the trailing teeth and bearing-wheels set relatively to each other as shown in Fig. 2, with the set-lever released, whereby said teeth and wheels are free to follow the irregularities of the ground; Fig. 6, a detail showing the trailing teeth in elevated position and the bearing-wheels in contact with the ground, similar to Fig. 4, although the bearing-wheels are adjusted relatively to the trailing teeth so as to further limit the depth of penetration of the spring harrow-teeth; Fig. 7, a detail of one of the bearing-wheels borne by the trailing-tooth bar; Fig. 8, a detail showing the connection between the two sections of the harrow, and Fig. 9 a detail showing the adjustable front shoe.

A represents the harrow-frame; $a$, a longitudinal bar attached at its forward end to the front end of the frame and extending rearwardly through the middle of the frame.

$b$ represents the toothed bars, arranged transversely with relation to the harrow-frame and having their ends bent upward and pivotally connected to the side bars of the frame.

$c$ represents the harrow-teeth, which are secured to said bars $b$, there being as many as may be desired.

$d$ represents the set-lever bar, which is connected with all of the transverse tooth-bars $b$ by links which are pivotally connected to the middle bar $a$, and $d'$ is the set-lever.

The harrow so far described is of usual construction, and, as is well known, the spring harrow-teeth $c$ may be operated by the set-lever and held so as to penetrate the soil to different depths and also may be held in elevated position when the harrow is being transported.

$e$ represents the front shoe.

A cross-bar $f$, which is herein shown as a bar of angle-iron, is journaled at its ends in brackets $f'$, secured to the rear ends of the side bars of the harrow-frame A, and said cross-bar $f$ has secured to it, substantially midway its length, a set-lever $f^2$, the locking dog or pawl $f^3$ of which engages one or another tooth of a quadrant $f^4$, which is secured to the rear end of the middle bar $a$. The pivoted cross-bar $f$ has secured to it a number of rearwardly-projecting teeth $f^5$, which are herein termed "trailing teeth," and they are herein shown as long slender spike-teeth arranged side by side in a row along the cross-bar. These rearwardly-projecting trailing teeth may be secured to said cross-bar $f$ in any usual or suitable way. The cross-bar $f$ may be operated by its set-lever $f^2$ and held in a number of different positions, six being herein shown, and the trailing teeth may consequently be held in a corresponding number of different positions, some in and some out of the ground.

Arms $g$ are secured to the front of the cross-bar $f$, which project forward, there being herein shown two forwardly-projecting arms secured to said cross-bar, one at or near each end thereof, although one or a number of such arms may be provided, as desired. These forwardly-projecting arms $g$ are adjustably secured to the cross-bar $f$ in any suitable manner; but for simplicity of construction a stand or bracket $g'$ is rigidly secured to the cross-bar, having a serrated side or face and having a hole through it, and one side of the arm $g$ is also serrated, and said arm has a hole through it, and a bolt passes through the hole in said arm and through the hole in said bracket $g'$, which serves as a means of securing the arm to the stand or bracket. The bolt may be loosened and the arm set in a number of different positions and the bolt then tightened, thereby firmly securing the arm to the stand or bracket in different positions relative to the trailing teeth. Other ways, however, may be provided for thus adjustably securing the arms $g$ to the cross-bar in lieu of that herein shown.

At the forward extremities of the arms $g$ bearing-wheels $g^2$ are journaled, and the journals of said bearing-wheels are set in any one of a number of holes formed or provided at the extremities of the arms, and these bearing-wheels $g^2$ are held in different positions relative to the trailing teeth $f^5$ by thus moving the bearing-wheels on the arms and also by adjustment of the arms bearing said bearing-wheels. As shown in Fig. 3, the trailing teeth $f^5$ are held in contact with the ground and the bearing-wheels $g^2$ elevated, and with the parts in this position the trailing teeth work in conjunction with and at the rear of the spring harrow-teeth and incidentally serve as rear supports for the harrow, particularly when the soil is hard.

When it is desired to allow accumulating trash to escape, the set-lever $f^2$ will be moved forward from the position shown in Fig. 3 and the trailing teeth raised, as shown in Fig. 4, at which time the bearing-wheels $g^2$ will be brought into contact with the ground and will serve as rear supports for the harrow, and said bearing-wheels will also at such time limit the depth of penetration of the spring-teeth.

When transporting the harrow, the trailing teeth $f^5$ and bearing-wheels $g^2$ will usually occupy the position shown in Fig. 4, yet the spring-teeth $c$ will be elevated, a result which may be accomplished by operating the set-lever $d'$.

If it is desired to limit the depth of penetration of the spring-teeth $c$ farther than as shown in Figs. 3 and 4, the arm $g$, carrying the bearing-wheels $g^2$, may be adjusted relatively to the trailing teeth, and one such adjusted position is shown in Fig. 6, and when said wheels $g^2$ are brought in contact with the ground the spring-teeth $c$ will enter the soil but a short distance. In such case, however, the set-lever $f^2$ will be moved but two or three teeth in either direction, and when the trailing teeth are brought in contact with the ground and the wheels elevated said trailing teeth will only be moved a short distance and will occupy substantially the same level as the wheels did when they were in contact with the ground.

If the condition of the soil is such that it is desirable both the bearing-wheels $g^2$ and trailing teeth shall at the same time be brought in contact with the ground, then the arms $g$, carrying said bearing-wheels $g^2$, may be adjusted, as shown in Fig. 2, and then by locking the set-lever $f^2$ in the position shown in said figure said bearing-wheels and trailing teeth will be thus rigidly held, both being in contact with the ground. With the parts in this position the bearing-wheel $g^2$ may be moved along its arm by setting its journal in a different hole, and when moved toward the end of the arm the pressure of the trailing teeth on the ground will be lessened and when moved in the opposite way the pressure will be increased. If, however, the condition of the soil demands that both the bearing-wheels and trailing teeth shall occupy a position in contact with the ground, yet shall be free to follow irregularities of the soil, then in such case the set-lever $f^2$ may be unlocked, as represented in Fig. 5, by disengaging the dog or pawl from the toothed quadrant and then locking the hand-lever or operating device of said dog or pawl by means of a link or hook $h$, which is carried by the set-lever.

The front shoe $e$ is adjustably secured to the frame of the harrow in order that it may occupy different elevations, and as a means of thus securing said shoe to the frame I have herein provided a clamp 20, which embraces the upper end of said shoe, and which is secured to the frame by two bolts 21, and said clamp has on its inner face a teat, which enters or passes through a hole in the shoe. The shoe is formed or provided with several holes, one above the other, any one of which will receive said teat for the purpose of accomplishing vertical adjustment of the shoe. By providing for adjustment of the front shoe as well as the trailing teeth it will be seen that the slant of the spring-teeth may be altered when at work in the ground and wear of the teeth compensated for.

I claim—

1. In a harrow, a frame, a front shoe, a set of harrow-teeth, means for operating said set of harrow-teeth, a cross-bar pivotally connected to the harrow-frame, a set of trailing teeth secured to it, one or more arms also secured to said cross-bar having bearing-wheels journaled at their outer ends, and means for rocking said cross-bar on its axis and for holding it in a number of different positions independent of the harrow-teeth, to thereby simultaneously move the trailing teeth and bearing-wheels independently of the harrow-teeth, substantially as described.

2. In a harrow, a frame, a front shoe, a set of harrow-teeth, means for operating said set of harrow-teeth, a cross-bar pivotally connected to the harrow-frame, a set of trailing teeth secured to said cross-bar and operating in rear of the harrow-teeth, one or more forwardly-projecting arms adjustably secured to said cross-bar and bearing-wheels journaled at the forward extremities of said arms, and means for rocking said cross-bar on its axis and for holding it in a number of different positions independent of the harrow-teeth to thereby simultaneously move the trailing teeth and bearing-wheels independently of the harrow-teeth, substantially as described.

3. In a harrow, a frame, a front shoe, a set of harrow-teeth, a cross-bar pivotally supported at the rear end of the harrow-frame, a set of trailing teeth secured to it operating in rear of the harrow-teeth, means for operating said pivoted cross-bar and for holding it in a number of different positions, and for releasing it, permitting it to freely rock, and one or more forwardly-projecting arms secured to said cross-bar and bearing-wheels journaled at the forward extremities of said arms, substantially as described.

4. In a harrow, a frame, a set of harrow-teeth borne by it, means for adjusting said teeth and for holding them in different elevated positions, a set of trailing teeth, means for adjusting said teeth and for holding them in different elevated positions independent of the harrow-teeth, one or more forwardly-projecting arms movable with said trailing teeth, and bearing-wheels carried by them adjustable thereon toward and from the trailing teeth, substantially as described.

In testimony whereof I have signed my name to this specification in the presence of two subscribing witnesses.

CHARLES S. SHARP.

Witnesses:
JAMES LETTIMORE,
CARROLL K. GARDNER.